May 7, 1940. W. L. MORGAN 2,200,184
ANTIFREEZE COMPOSITION
Filed Oct. 20, 1938
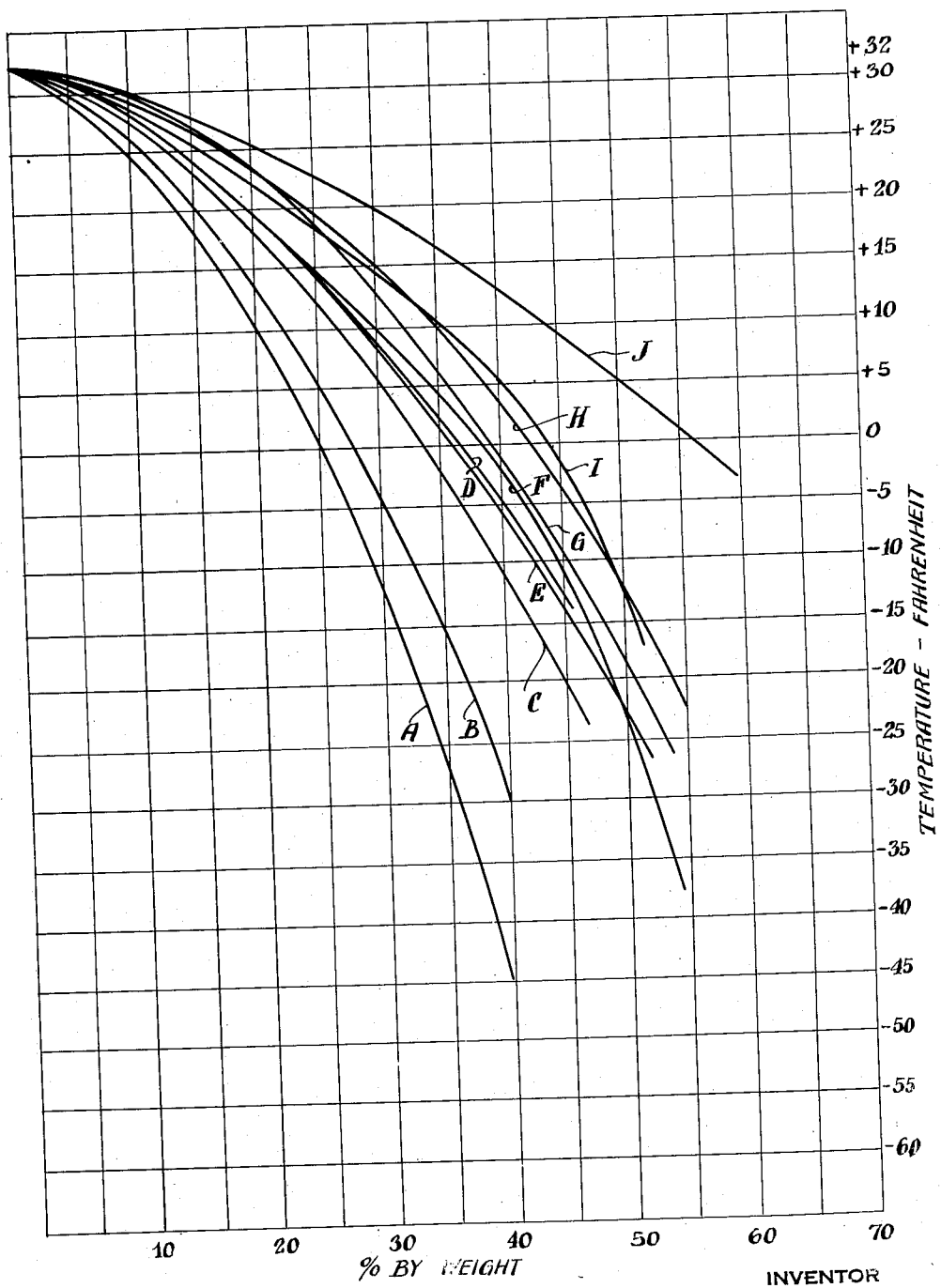
INVENTOR
Willard L. Morgan
BY
Alan M. Mann
his ATTORNEY Patented May 7, 1940

2,200,184

UNITED STATES PATENT OFFICE 2,200,184

ANTIFREEZE COMPOSITION

Willard L. Morgan, Edgewood, R. I., assignor to American Maize-Products Company, a corporation of Maine Application October 20, 1938, Serial No. 235,959

4 Claims. (Cl. 252—5)

My invention relates to water freezing point depressants and more particularly to antifreeze liquid compositions for use in automobile radiators, hydraulic brakes and commercial refrigeration apparatus.

Heretofore the antifreeze compositions used for lowering the freezing point of the water used in automobile radiators, etc., have been generally of two types, namely, ordinary alcohols, and glycerine or glycerol compounds. The ordinary alcohols that have been widely used for these purposes are subject to the objection of being volatile and therefore lost from the system in substantial amounts, which renders the use of these alcohols expensive despite their low initial cost. The odor of these alcohols, especially under elevated temperature conditions, is objectionable as is also their solvent action on the lacquer paints used on automobiles.

The glycerine type antifreeze compositions heretofore used are represented principally by glycerine and by ethylene glycol, commonly sold under the trade-name of "Prestone." Although these materials are high boiling and non-volatile and have been generally satisfactory, their commercial use has been restricted because of the relatively high cost, which is due to some extent to the scarcity caused by use of these materials for other purposes such as in glyptal resins. The cost of these materials for use in anti-freeze compositions has made them prohibitive for a large number of automobile owners.

Another type of antifreeze composition that has been suggested, and used to a slight extent, is sodium lactate. Although this material has a great power of lowering the freezing point of aqueous solutions, its use as an antifreeze agent has not been at all satisfactory. In the first place the material is highly corrosive to metal parts and secondly, when it comes in contact with heated surfaces such as automobile pistons and where it leaks through the engine head gaskets, it evaporates and leaves a solid, hard, stone-like residue. This residue fuses down on the metal or rubber parts subjected to heat and in some instances has resulted in sticking and jambing of the operating parts requiring the entire motor to be taken apart before it could be used again.

An object of my invention is to provide an improved antifreeze composition which possesses the advantageous features of the compositions heretofore used and is free of their undesirable characteristics.

In accordance with my invention I have discovered that a number of aminol and polyamine salts possess the property of markedly depressing the freezing point of water, and being highly dissociable in water their aqueous solutions may be used effectively as antifreeze liquids. These materials are non-volatile and thereby avoid the objections to the normal alcohols heretofore used. They are substantially ashless, that is, they either form no residue or a residue that is easily decomposed, leaving no substantial amount of ash. Because of this characteristic they are not subject to the disadvantages of sodium lactate. The antifreeze compositions containing these salts of alkylolamines (hydroxyamines) or polyamines lower the freezing point of water to equal or lower temperatures than those obtained with glycerine and ethylene glycol. These salts of hydroxy amines and polyamines are easily soluble in water in contrast to some salts of the simple amines and their aqueous solutions are relatively thin, thus enabling easy pumping of the fluids through the mechanical system at low temperatures. These salts show no tendency to volatilize or decompose or otherwise change when their solutions are boiled such as occurs with the salts of the easily volatile simple amines and they will, therefore, remain in the refrigerating or cooling system in the same state in which they are introduced. They are free of any appreciable disagreeable odor and particularly of fishy odors characteristic of simple amine salts. Aqueous solutions of these materials mix readily with aqueous solutions of the presently used antifreeze agents and therefore can be mixed with the latter as well as being used alone. These salts will not crystallize in the range of concentrations used in the antifreeze solutions, and solutions of above 70% strength are easily secured with most of the salts disclosed. Also, they will not adversely affect the lacquer paints used in automobiles nor the rubber parts used in the circulating systems.

The amino salts that I have found particularly satisfactory for use in this invention comprise the substantially neutral salts of the alkyl polyamines and alkylol amines. These salts may be prepared by reacting the amines, which are highly water soluble, with relatively strong acids, which may be either organic or inorganic acids, lactic acid being a representative example. The organic amino bases from which the salts are formed to provide suitable antifreeze agents may be represented by the following generic formula:

in which $R_1$ is either an alkyl group containing one or more amine groups, or an alkylol group or alkyl hydroxy or alkyl polyhydroxy group, or an alkyl group containing both amine and hydroxy groups; and $R_2$ and $R_3$ are either hydrogen, an alkylol, an alkyl amine, or a mixed alkyl amine and hydroxy radical of the general types suitable for $R_1$. In each case the aminated side groups suitable for $R_1$, $R_2$, $R_3$, contain only primary or secondary aliphatic amine linkages. Also the carbon chains between adjacent amino or hydroxy groups do not exceed six carbons.

Some of the salts of the alkyl polyamines and alkylolamines that may be used satisfactorily as freezing point depressants, in accordance with my invention, are as follows: The lactates, acetates, chlorides, sulphates, citrates, tartrates and phosphates of ethylene-diamine, diethylene triamine, triethylene tetramine, monoethanolamine, diethanolamine, triethanolamine, propanolamine, monamino glycerol or mono amino propanediol, diaminopropanol and tri-isopropanol amine.

Illustrative but non-limiting examples of these salts and their formulas are given below:

Diethylene triamine dihydrochloride. $HCl.NH_2CH_2CH_2NHCH_2CH_2NH_2.HCl$
Triethylene tetramine diacetate. $CH_3CO_2H.NH_2CH_2CH_2NHCH_2CH_2NH\text{-}CH_2CH_2NH_2.HCO_2CH_3$
Ethylenediamine sulphate. $[NH_2(CH_2)_2NH_2].H_2SO_4$
Diaminopropanol phosphate. $[CH_2OH\text{—}CHNH_2\text{—}CHNH_2]_3[H_3PO_4]_2$
Triisopropanol tartrate. $[(CH_3CHOHCH_2)_3N]_2.(HCO_2)_2(CHOH)_2$
Monoethanolamine lactate. $HOCH_2CH_2NH_2.HCO_2CHOHCH_3$
Diethanolamine chloride. $(HOCH_2CH_2)_2NH.HCl$
Triethanolamine acetate. $(HOCH_2CH_2)_3N.HCO_2CH_3$
Monopropanolamine sulphate. $[HOCH_2CH_2CH_2\text{—}NH_2]_2.H_2SO_4$
Monoamino-glycerol (monoamino propanediol) citrate. $[CH_2OH\text{—}CHOH\text{—}CH_2NH_2]_3H_3C_6H_5O_7$ The proportionate amounts of the amines and acids used to prepare the above salts will vary widely with the different amines. An example of a satisfactory product is one produced by reacting molecular proportions of these two constituents at room temperature, or if necessary, warming until the salt has been formed completely. In general, it will be desirable to combine the amines and acids in such proportions that the resulting salts will have a pH of about 6 to 9. That is, the salts will be substantially neutral or slightly alkaline; salts strongly acid in reaction being avoided to prevent corrosion of metal parts.

For a number of uses of the antifreeze composition, such as in automobile radiators, it is not necessary to produce a highly purified product and therefore, technical grades of acid or acid distillation residues and technical grades of amines may be used for preparing the amine salts. The salt may be prepared by thoroughly mixing the amine and acid at room temperature. A specific but non-limiting example comprises making monoethanolamine lactate by mixing approximately 68 pounds of the commercial (approximately 100%) monoethanolamine with approximately 200 pounds of 50% lactic acid; the mixture being stirred or agitated until the reaction is complete. This reaction generates heat and while it is desirable to cool the mixture during the reaction, this is not essential. In this example there will be produced approximately 268 pounds of 62.6% monoethanolamine lactate solution. The pH of the final solution may be adjusted to about 6 to 9, or to render the solution slightly alkaline, which will minimize the corrosive action.

To prepare the liquid, antifreeze composition in the form in which it will normally be used in automobile radiators, etc., amine salts such as those described above, are mixed with water in proportions of about 25% to 65% by weight of the amine salts to 75% to 35% of water. An advantageous range of proportions for the two materials is about 30% to 50% of amine salts to 70% to 50% of water, by weight, a preferred proportion being 40% amine salt and 60% water. The above described amine salts by reason of their numerous hydroxyl and amino groups, dissolve readily in water and the composition may be prepared by simply mixing the amine salt and water at room temperatures or at elevated temperatures if desired.

While I prefer to use the salts of the amines described above, I may use the amine bases as such, that is, the alkylol amines and alkyl polyamines. The amine bases are more expensive and less efficient than the salts, which in practice makes the salts more desirable. The utility of my antifreeze solution for protection against various degrees of weather hazard is indicated by the curves in the accompanying drawing.

Referring now to the drawing, the curves A to J represent respectively the freezing points of aqueous solutions of different strengths of the several alkylolamines, polyamines and their salts, as follows:

Curve A _____ Monoethanolamine chloride
Curve B _____ Monoethanolamine acetate
Curve C _____ {Monoethanolamine / Monoethanolamine sulphate
Curve D _____ Monoethanolamine citrate
Curve E _____ Monoethanolamine lactate
Curve F _____ Ethylene-diamine dilactate
Curve G _____ Diethanolamine lactate
Curve H _____ Triethanolamine lactate
Curve I _____ {Triethanolamine / Triethanolamine phosphate / Monoethanolamine tartrate
Curve J _____ {Dimonoethanolamine / Monohydrogen phosphate In solutions of 40% strength, by weight, it will be noted from the accompanying curves A to J that the freezing points for the respective amines and salts are approximately as follows:

|  | Degrees Fahrenheit |
|---|---|
| Monoethanolamine chloride | −45 |
| Monoethanolamine acetate | −30 |
| Monoethanolamine | −10 |
| Monoethanolamine sulphate | −10 |
| Monoethanolamine citrate | − 5 |
| Monoethanolamine lactate | − 5 |
| Ethylene-diamine dilactate | −1.5 |
| Diethanolamine lactate | − 1 |
| Triethanolamine lactate | + 4 |
| Triethanolamine | +10 |
| Triethanolamine phosphate | + 5 |
| Monoethanolamine tartrate | + 5 |
| Dimonoethanolamine— Monohydrogen phosphate | +13 |

The freezing points for the above compositions at strengths of less than 40% and more than 40% may also be obtained from the accompanying curves.

In addition to the above described desired characteristics, my new antifreeze compositions are relatively odorless and non-toxic. They are practically non-corrosive, but to increase their non-corrosiveness I may add small amounts (up to 1%) of the usual materials added to antifreezes for this purpose, such as fatty oils, urea, fluorides, chromates, thiazoles, borates or antimonyl compounds.

Various modifications and changes may be made in the materials, processes and products hereinabove described, without departing from the scope of my invention, some of the novel features of which are defined in the appended claims.

I claim:

1. A method of depressing the freezing point of the water in cooling systems such as automobile radiators, comprising adding to such water about 25% to 65% by weight of a salt of an aliphatic organic amino base and a strong acid, said salt being substantially odorless, ashless, non-corrosive, water soluble and non-volatile, being non-crystallizing in the aforesaid proportions and capable of effecting unassisted the depressing of the freezing point of the water substantially below its normal freezing point so that the water and salt solution will have a freezing point of around 15° F. at the low end of the aforesaid range of percentages of salt and a freezing point of about −40° F. and below at the upper end of the range of said percentages of salt.

2. A method as defined in claim 1, in which the freezing point depressing salt is one formed from an alkylolamine and a strong acid.

3. A method as defined in claim 1, in which the salt is selected from the group consisting of alkylolamine chlorides, acetates, sulfates, citrates, tartrates and lactates.

4. A method as defined in claim 1, in which the salt is present in the water in a proportion of about 30% to 50%, has a pH of about 6 to 9 and when present in a proportion of 40% depresses the freezing point of the water to a temperature within the range of about 10° F. to minus 45° F.

WILLARD L. MORGAN.